United States Patent [19]

Kelly

[11] Patent Number: 5,493,933
[45] Date of Patent: Feb. 27, 1996

[54] ONE PIECE SHIFT LEVER MOUNT ADAPTER FOR A BICYCLE

[76] Inventor: Christopher J. Kelly, 2574 Grant Ave., San Lorenzo, Calif. 94580

[21] Appl. No.: 179,390

[22] Filed: Jan. 10, 1994

[51] Int. Cl.⁶ .............................. B62M 25/04; F16C 1/10
[52] U.S. Cl. ............................................ 74/489; 74/502.2
[58] Field of Search .................... 74/489, 475, 502.2; 403/192, 187

[56] References Cited

U.S. PATENT DOCUMENTS

| 4,275,615 | 6/1981 | Yoshigai | 74/489 |
| 4,878,395 | 11/1989 | Romano | 74/489 X |
| 5,287,766 | 2/1994 | Nagano | 74/502.2 |

FOREIGN PATENT DOCUMENTS 509457  10/1992  European Pat. Off. .............. 74/502.2

Primary Examiner—Rodney H. Bonck
Assistant Examiner—Mary Ann Battista

[57] ABSTRACT

A mount for supporting a gear shift lever on a tightly undercurved road or racing style handlebar of a bicycle, comprising an annular attachment collar for placement over and close fit to the curve of the handlebar, with the attachment collar securable in place by compression between an existing hand brake lever mount and the handlebar. The attachment collar is defined by an annular wall preferably having varying length allowing for close fit in the inside and outside radii of the tight bend in the handlebar. Extending from the attachment collar is an extending member having a universal shift lever mount stud affixed to a distal portion thereof. The extending member preferably includes one or more angular changes allowing placement of the extending member clear of the brake lever simultaneously with thumb accessible placement of the shift lever relative to normal hand placements on the handlebar. The shift lever mount stud is structured to allow attachment of essentially all existing shift levers manufactured for attachment to the down tube of a bicycle frame, and thus allows the economical re-location of existing shift levers from the down tube of a bicycle upward to the handlebar. Left hand and right hand mounts are provided allowing placing of the rear gear change lever on one side, and the front gear change lever on the opposite side of the handlebar. Cable housing end supports (cable stops) are preferably also attached to the shift lever mounts.

3 Claims, 9 Drawing Sheets

ONE PIECE SHIFT LEVER MOUNT ADAPTER FOR A BICYCLE

BACKGROUND OF THE INVENTION

1. Field of the Invention

This invention relates to mounts or mounting brackets for supporting manually or hand operated gear change levers or shift levers on multi-speed bicycles. The present invention is a mount particularly for supporting a bicycle gear shift lever adjacent to and inboard of the hand brake lever on tightly undercurved road or street racing style handlebars, and within convenient reach of the rider's thumb while grasping on the handlebar.

2. Description of the Prior Art

In the prior art, there are multi-speed bicycles having gear shift levers mounted on the frame down tube, with this shift lever mount position having the disadvantages of requiring the rider to release his grip from the handlebar in order to actuate the gear change lever, and oftentimes the rider needs to remove his eyes from the road momentarily to locate the gear change lever. The removing of one's hand from the handlebar can clearly pose control problems, as can removing one's eyes from the road, even if only momentarily, and may also lead to a brief loss of concentration which is undesirable in road racing.

Although there have been mounts for supporting gear shift levers on bicycle handlebars near the hand grip in the past, none of which I am aware are structured similar to my lever mount, nor, because of the structural differences, do they offer the benefits of the present invention. These prior art mounts for supporting the gear shift lever on the handlebar are structured for use on horizontally disposed, generally straight-bar off-road or dirt bike style handlebars which are absent the radical undercurves in the hand grip area common to road or street racing style handlebars found on multi-speed road or street racing bicycles. The prior art mounts structured for use on horizontally disposed and generally straight off-road (dirt bike) style handlebars are structured to support the shift lever adjacent to and inboard the hand grip, wherein the thumb of the rider is normally in a position to extend outward from the grip toward the handlebar stem (inboard) and parallel to the handlebar to actuate the shift lever. With such off-road handlebar type shift lever mounts, since the rider's hand is on the grip of the horizontally disposed bar, the thumb approach to the shift lever is such that the extending thumb is essentially on top of the handlebar and parallel thereto, and therefore these prior art lever mounts are necessarily very low profile and support the shift lever in very close proximity (¼ to ¾ inch) to the handlebar and aiming or extending toward the handle grip, and generally extending lengthwise parallel to the handlebar toward the hand grip.

I am not aware of any inexpensive and convenient to attach and use gear shift lever mounts for use with tightly undercurved road or racing style handlebars which are structured suitably for supporting a gear shift lever within easy reach of the rider's normal and typical grasp on undercurved road or racing style handlebars, and such a mounting bracket would be and is desirable in order to allow the rider to shift gears without having to release his grasp from the road style handlebar, or having to remove his eyes from the road to locate the shift lever. Additionally, such a shift lever mount would allow for shifting gears while simultaneously applying braking with the adjacent hand brake lever, and this too may be desirable in certain situations.

SUMMARY OF THE INVENTION

The following description, written with briefness in mind for those skilled in the art, is intended to describe structural embodiments and features of my invention generally in preferred structure by way of example, and is not intended to overly limit the scope of my invention, as changes to that which is described and shown in the drawings may clearly be made without departing from the true scope of the invention.

The present invention is an inexpensive and convenient mount for supporting a gear shift lever of a bicycle on the handlebar to allow the locating or relocating of the shift levers into an area which allows for gear shifting of a multi-speed bicycle normally without having to remove one's hand from the handlebar or having to take one's eyes off of the road while riding. The present shift lever mount is structured specifically for attachment in the tight radius undercurve of road or racing style handlebars in order to support the gear shift change lever adjacent the hand brake lever and within reach of the rider's thumb while his hand is in a normal grasping positions on the road or racing style handlebar.

A preferred structural embodiment of my mount includes a ring-like attachment collar structured for placement over and close fit around the handlebar, with the attachment collar removably and adjustably securable in place preferably by compression underneath the existing hand brake lever mount. The attachment collar is defined by a thin annular wall preferably having varying heights or lengths allowing for a close fit in very tight radius bends on street or racing style handlebars, while providing a sufficient portion of the attachment collar to be sandwiched between the handlebar and the brake lever mount. Extending away or outward from the attachment collar is a rigid elongated extending member, which is preferably hollow tubing or otherwise rendered light in weight. The extending member preferably includes one or more angular changes allowing placement of the extending member clear of the brake lever simultaneously with ideal placement of the shift lever relative to normal and typical hand placements on the handlebar, and for operation of the shift lever by the thumb of the adjacent hand grasping the handlebar. The angular changes also allow for the proper orientation of the shift lever mount stud as will be fully appreciated with continued reading.

A universal-style shift lever mount stud is affixed to the distal end portion of the extending member. The shift lever mount stud is structured to allow attachment, using a threaded screw or bolt (mounting fastener), of essentially all existing shift levers manufactured for attachment to the frame down tube of a bicycle, and therefore also allows the economical relocation of existing shift levers from the down tube of a bicycle upward to the handlebar. Left hand and right hand mounts in accordance with the present invention are provided allowing placing of the right or rear derailleur gear change lever on the right side, and the left or front derailleur gear change lever on the left side of the handlebar. My shift lever mounts, when attached, extend toward one another, or in other words are each inboard of the exterior of the hand grip areas of the handlebar, and extending generally toward the longitudinal centerline axis of the bike, and are thus accessible by the thumb of the rider's adjacent hand, and are somewhat protected from damage in a crash. The angular change in the extending member allows for the positioning of the shift lever mount stud to be oriented on the right side of the handlebar identically to the orientation of a right gear shift lever mount stud typical of a frame down tube, i.e., facing outward away from the centerline axis of the bike. This allows my invention to function in a conventional and familiar manner, wherein pushing the right hand shift lever forward causes slacking in the right shift cable and the rear derailleur to shift the drive chain to a higher gear ratio, and forward movement of the left hand shift lever causes slacking in the left shift cable and the front derailleur to shift the drive chain to a lower gear ratio at the pedal crank gears, which is what bicyclists are familiar with. Therefore, bicyclists will not have to re-familiarize themselves with shifting with my invention, and this gives the advantage that a rider can relocate his shift levers from the down tube upward to the road style handlebars, and immediately begin riding and be quite familiar with the shift lever movements and the resultant gear ratio changes. Those skilled in the art will recognize that the right hand shift lever and the left hand shift lever made specific for attachment to opposite sides of the bike down tube are the reverse of one another, and therefore are not designed to be interchangeable in position with one another, and this is addressed by my invention by way of the positioning of the shift lever mount stud being such that the right hand shift lever from the down tube may simply be moved up to the right side of the handlebar, and the left hand shift lever from the down tube may be move up to the left side of the road style handlebar, and to this end, with my invention, the distal ends of my shift lever mount studs are facing outward or away from the longitudinal center axis of the bicycle, due to angular changes in my extending member, just as they are or were oriented on the frame down tube.

The length of the extending member in combination with the angular change or changes therein is such that the mount stud and the shift lever itself is supported away from the hand grip area a distance of about the length of an average human thumb, with this being to allow locating by feel, and shifting with the thumb while grasping the handlebar adjacent the hand brake lever, whether grasping just above or just below the brake lever mount. While riding, the rider may push the shift lever away from him, which is normally forward and upward somewhat, with the front of his thumb or top of his thumb, or may push or pull the shift lever toward him, which is normally also somewhat downward, with the back or top of his thumb while still grasping the handlebar just above or below the brake lever mount with the balance of his hand and fingers, and this without averting his eyes from the road.

As hereinabove mentioned, and as those knowledgeable in this field recognize, gear shift levers on multi-speed bicycles push (give slack) and pull against metal shift cables normally housed within flexible cable housings. The pushing or pulling of the cables actuate spring-loaded gear change devices at the opposite ends of the cables, normally referred to as derailleurs, and which are responsible for moving the drive chain to either a smaller or larger gear, and thus changing the gear ratio of the drive assembly of the bicycle. Cable housing end supports (cable stops) are preferably also attached to my shift lever mounts in order to support the cable housings in a stable manner and to maintain and guide the shift cable in a generally perpendicular approach to the longitudinal axis of the mount stud after the cable exits the terminal end of the stabilized cable housing, as is common in the industry. The shift cables and cable housings will normally need to be replaced or otherwise lengthened when relocating the shift levers from the frame down tube up to the handlebar.

My shift lever mount is preferably made of rigid light weight materials such as lightweight metals, but could be plastics or the like, as weight considerations of only a few grams can often be important to bicycle enthusiasts and racers.

From the above, it should be understandable that an object of the present invention is to provide an inexpensive and convenient to attach and use gear shift lever mount for a bicycle which allows supporting the shift lever on tightly undercurved road or street racing style handlebars within easy thumb reach of the rider's grasp on the handlebar.

A further object is to provide the hereinabove mentioned mount structured with an extending member which includes one or more angular changes (sufficient angular change) over its extending length, allowing placement of the extending member clear of the hand brake lever simultaneously with proper placement of the shift lever relative to normal and common hand placements on the handlebar.

A further object is to provide the hereinabove mentioned mount structured to support a distal end of the shift lever attachment stud positioned aiming generally toward the attachment collar (facing outward of the longitudinal centerline axis of the bike) so as to provide for the use of a gear shift lever made specific for mounting on a specific side of a bicycle frame down tube to be located on the same specific side of the handlebar so that shift cable movements remain the same relative to shift lever movements so that the operation and resultant gear ratio changes remain familiar to bicyclists.

A further object is to provide the hereinabove mentioned mount structured to support the shift lever in a position wherein normally the rider will not have to remove his hand from the handlebar to operate the shift lever, or remove his eyes from the road, wherein the shift lever is supported about a thumb's length away from the handlebar, allowing the rider to push against, using the back, front or bottom of his thumb, the lever with his extended thumb while still grasping the handlebar with the rest of his hand and fingers.

A further object is to provide the hereinabove mentioned mount preferably structured with a universal shift lever mount stud so as to allow the economical relocation of all or virtually all existing shift levers from the down tube of a bicycle upward to the handlebar, so that a person who already owns a bicycle may relocate his shift levers from the down tube upward to the handlebar, virtually regardless as to the make and model of his down tube shift levers, and this without great cost or having to spend a great deal of time to make the modification.

A further object is to provide the hereinabove mentioned mount structured with a handlebar attachment collar shaped to fit in very tight bends on road or racing style handlebars so as to render a neat appearing fit which allows for handlebar tape to be applied thereover if desired; and in addition with the fit being non-obtrusive so as to not significantly interfere with the rider grasping the handlebar in the area of the attachment collar.

A still further object is to provide the hereinabove mentioned mount structured to allow un-obstructed access to the head face of the mounting fastener which attaches the shift lever to the mount stud so as to allow the ready attachment, servicing and replacement of shift levers as desired.

A further object is to provide the hereinabove mentioned mount structured in a manner which does allow the individual some degree of choice as to precisely where the shift levers are to be supported relative to where he normally places his hands on the handlebar adjacent the hand brake whiling riding.

A still further object is to provide the hereinabove mentioned mount structured in sets of a left and right hand mount for allowing placing of the rear gear change lever on one side, and the front gear change lever on the opposite side of the handlebar.

An even further object is to provide the hereinabove mentioned mount structured with cable housing end supports (cable stops) positioned to stabilize the cable housing, and maintain and guide a proper approach of the shift cable toward the mount stud and to the shift lever.

The hereinabove, as well as other objects and advantages of my invention will become more apparent by examining the remaining specification and claims with a comparison of the accompanying numbered drawings.

DESCRIPTION OF THE PREFERRED EMBODIMENTS

Figure 7:
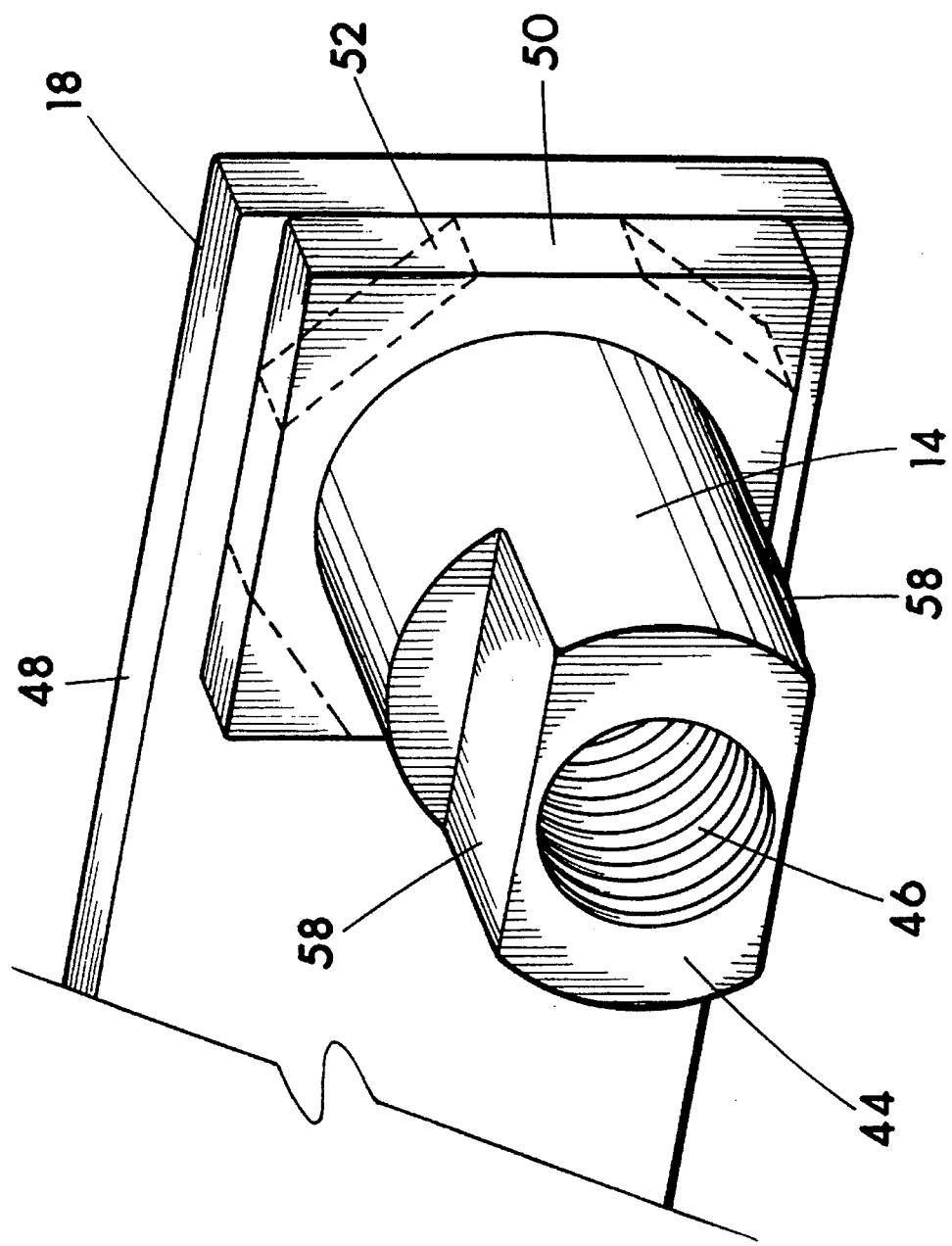
FIG. 7 is an illustrative view of the preferred universal shift lever mount stud shown enlarged for greater detail.
Figure 8:
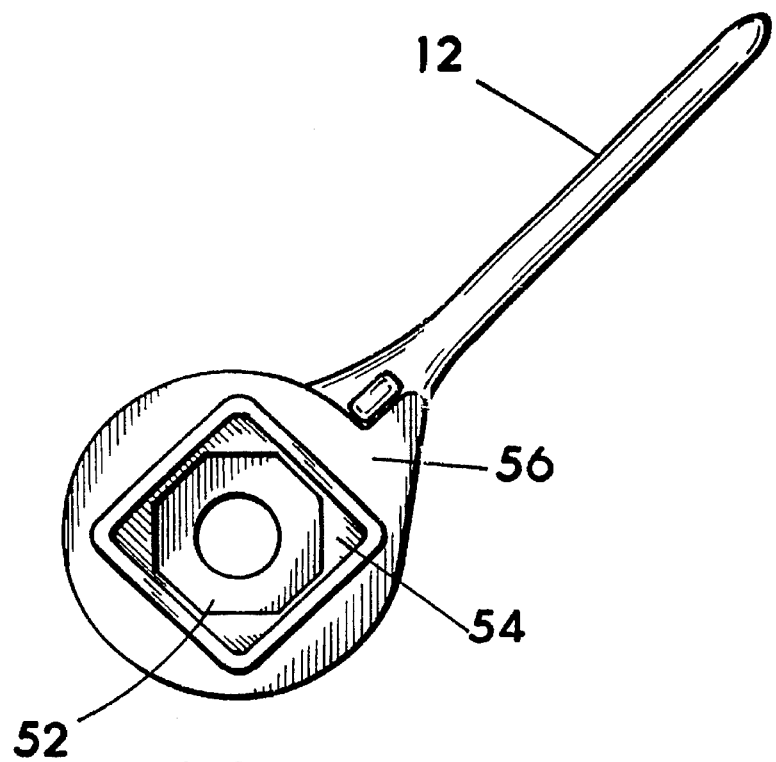
FIG. 8 is a view of the back side of a typical existing shift lever having a square base-accepting socket or recess suitable for use with the present invention.
Figure 9:
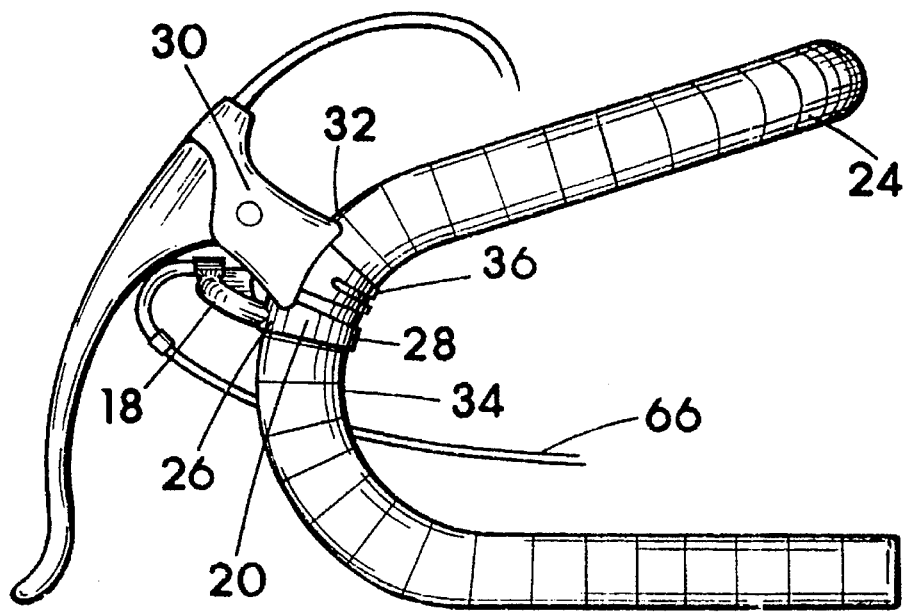
FIG. 9 is an illustrative view of the left side of a road or street style handlebar showing a brake hand lever and the present invention (left hand version) mounted thereon, and both mounted over the handlebar tape.
Figure 10:
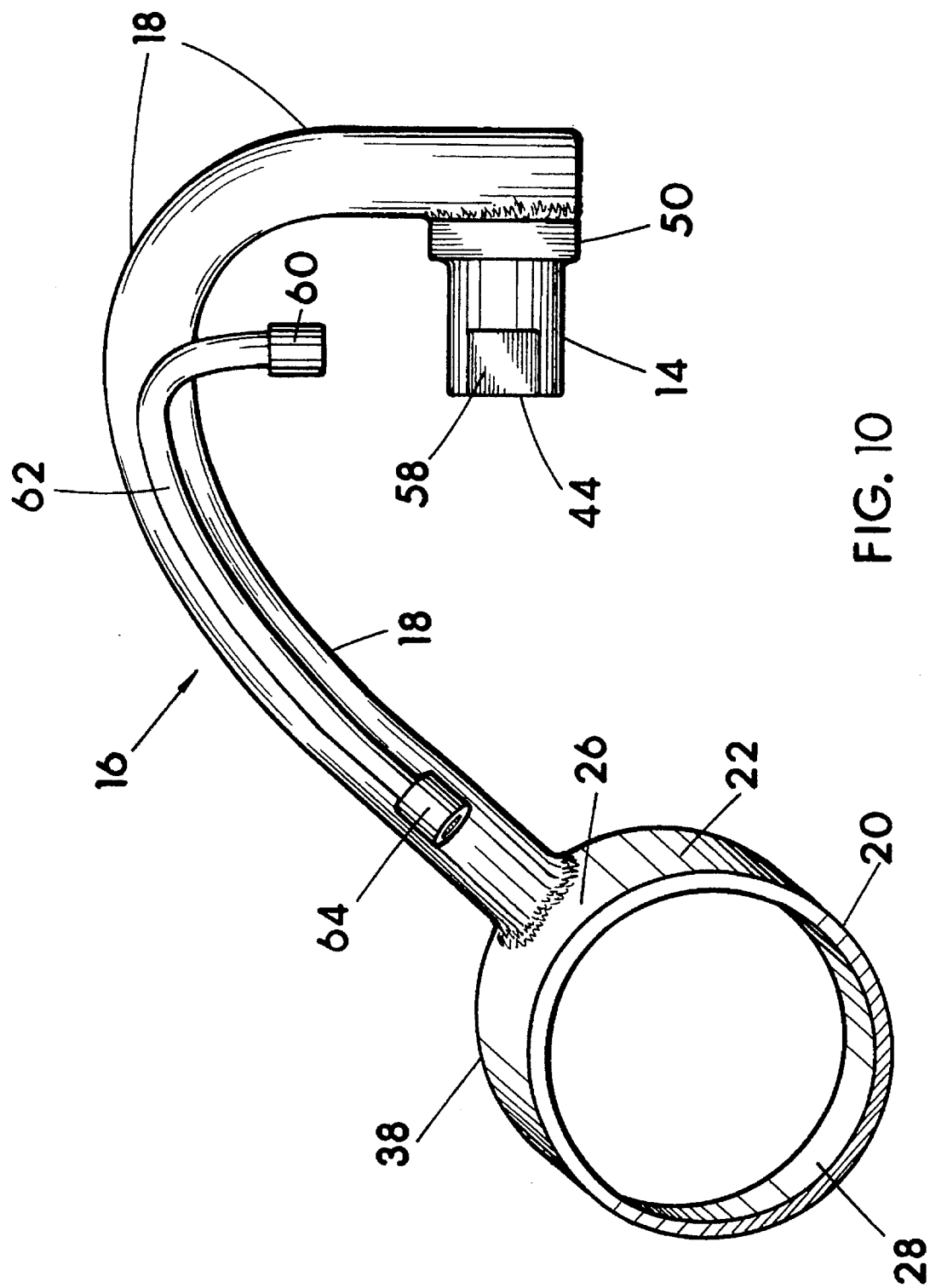
FIG. 10 is an illustrative view of a second preferred embodiment of the present invention illustrating that some structural differences may be made to that of the first preferred embodiment within the scope of the invention.

Referring now to the drawing FIGS. 1–9 for a detailed description of a preferred embodiment of the present invention. Drawing FIGS. 1–6 and 9 show a first preferred embodiment of my shift lever mount 10 with FIGS. 1–3 and 9 showing it with a shift lever 12 attached. FIG. 7 shows a preferred universal shift lever mount stud 14 shown enlarged for greater detail, which is preferably a part of my shift lever mount 10 so it will function with all known shift levers 12 made for attachment to bicycle frame down tubes (not shown because bike frame down tubes having shifters thereon are well known). FIG. 10 shows a second preferred shift lever mount embodiment 16 of my invention which is shown only to illustrate that some structural differences may be made to that of the first preferred embodiment of shift mount 10 within the scope of the invention. Like part numbers have been applied to the features common to both embodiments 10 and 16, and thus the balance of the remaining detailed description will be directed toward embodiment 10 (shift lever mount 10). The right hand version and the left hand version of mount shift lever mount 10 are essentially identical to one another with the exception that they are the reverse of one another so that the extending member 18 of each of the versions extends inward toward the longitudinal centerline axis of the bicycle and essentially toward one another, and so that the shift lever mount studs 14 are each generally facing outward away from the centerline axis of the bicycle.

Shift lever mount 10 includes the tubular attachment collar 20 defined by an annular wall 22 which is made of rigid and relatively thin material such as steel, aluminum, titanium or rigid plastics for examples. Attachment collar 20 includes a central opening or bore slightly larger in diameter than the external diameter of handlebar 24 so the collar 20 can slip over the terminal end of the handlebar 24. The annular wall 22 of attachment collar 20 has a long side 26 and an oppositely disposed relatively short side 28. The long side 26 would normally be placed underneath the hand brake lever mount 30 when in a loosened condition on the handlebar 24, and with sharply undercurved handlebars such as are used with street or racing style bicycles, the hand brake lever mount 30 is affixed in the center of the outer or longer radius 32 of the sharp bend in the tubing of the handlebar 24. With the long side 26 inserted underneath the brake lever mount 30, the brake mount 30 may be tightened to secure the attachment collar 20 stationary. The short side 28 of attachment collar 20 thus would be placed oppositely the hand brake lever mount 30 and in the inside or shorter radius bend 34 in the handlebar 24, whereat the short side 28 length of the annular wall 22 fits in close proximity to the handlebar 24 and to the attachment band 36 of the hand brake mount 30. Attachment collar 20 could possibly be split similar to a hose clamp or many other known clamps wherein the ends would be attachable to one another with a nut and bolt or a screw, again much like a hose clamp, but this is far less preferred due to the increased bulk, and cost of the nut and bolt or screw. Although a split attachment collar or non-split collar with set-screw would somewhat meet the required function of the present invention, they are seen as unnecessary since if attachment collar 20 is made thin in nature it can be clamped underneath the existing hand brake lever mount 30, and provides a relatively smooth surface in an area which is commonly grasped by the rider. It is known to those skilled in the art that hand brake lever mounts 30 include an attachment band 36 with diameter adjustment capabilities, similar to a hose clamp, applied around the handlebar and affixed to the brake mount 30, the band 36 being tightenable with a bolt or screw positioned underneath the hood of the brake mount 30 and accessible with the brake lever pulled toward the handlebar. The tightening of the screw underneath the hood of the brake mount 30 tightens the brake mount against the handlebar.

Figure 1:
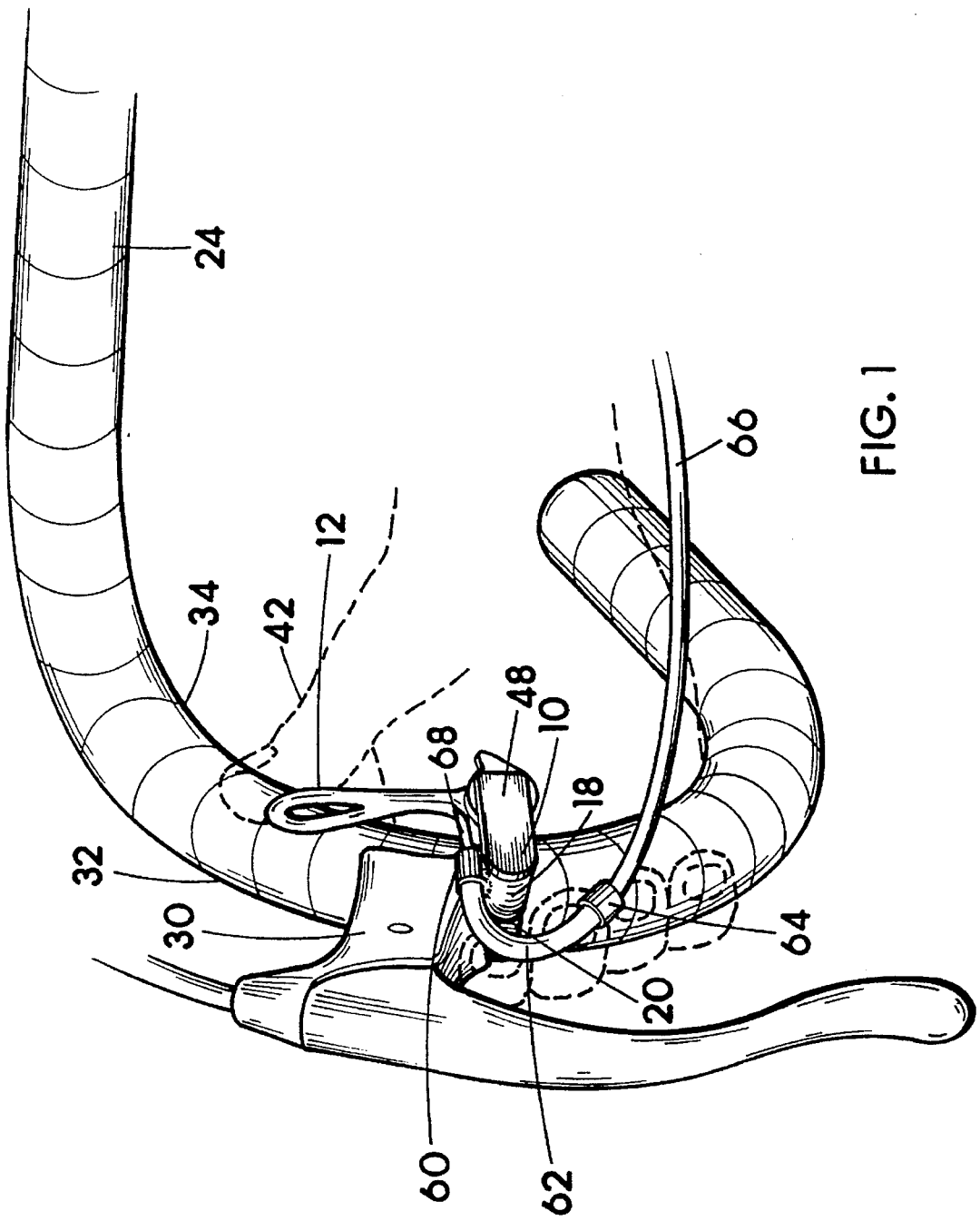
FIG. 1 is an illustrative view of the right hand side of a road or street racing style handlebar having a tight undercurve and showing a first preferred embodiment of my invention supporting a shift lever adjacent the hand brake lever.
Figure 2:
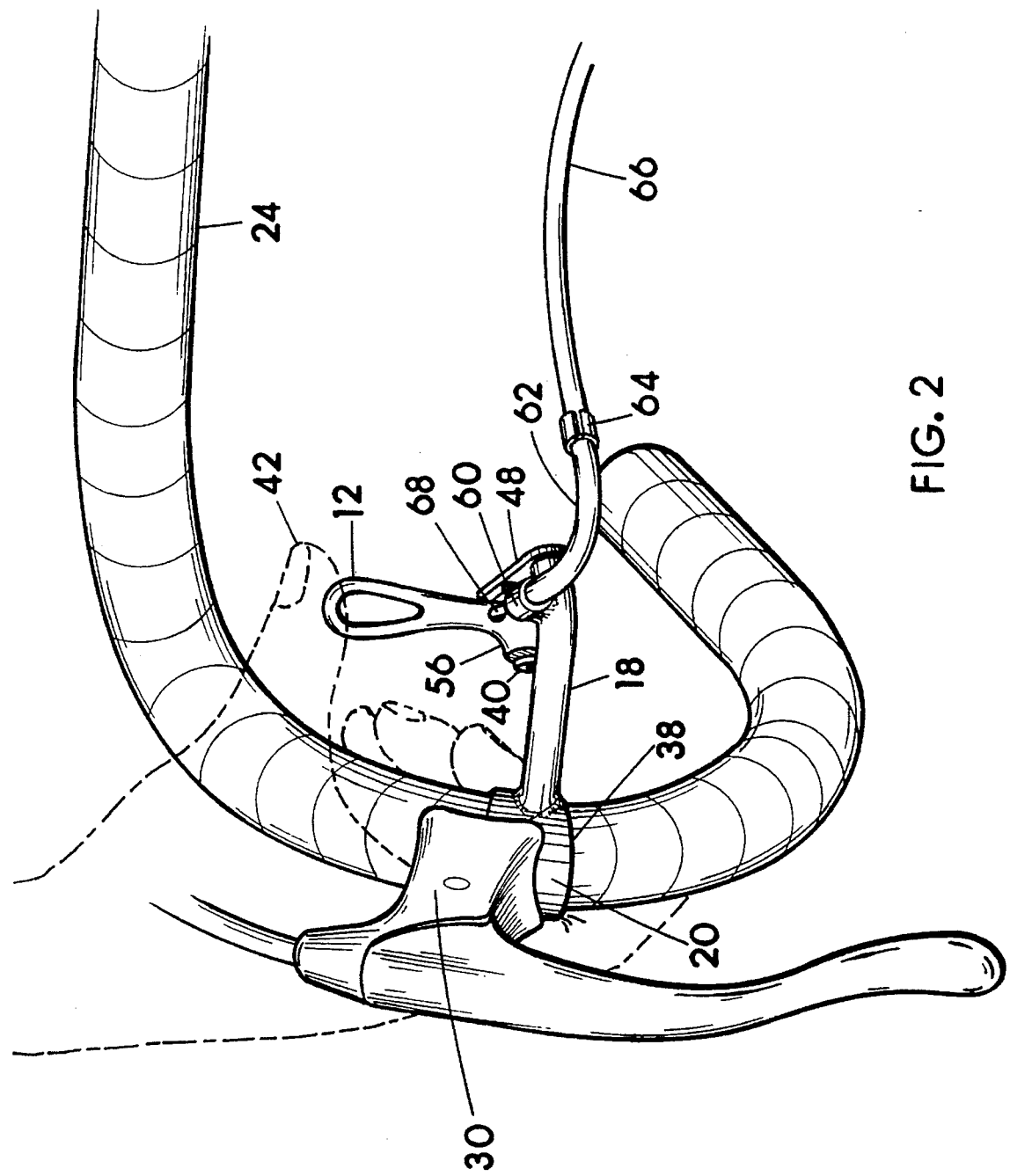
FIG. 2 is again an illustrative view of the right hand side of a road or street racing style handlebar showing the first preferred embodiment of my invention rotated slightly around the handlebar from that shown in FIG. 1 to illustrate some possibility of choice in the positioning of the shift lever the rider is given with the present invention.
Figure 3:
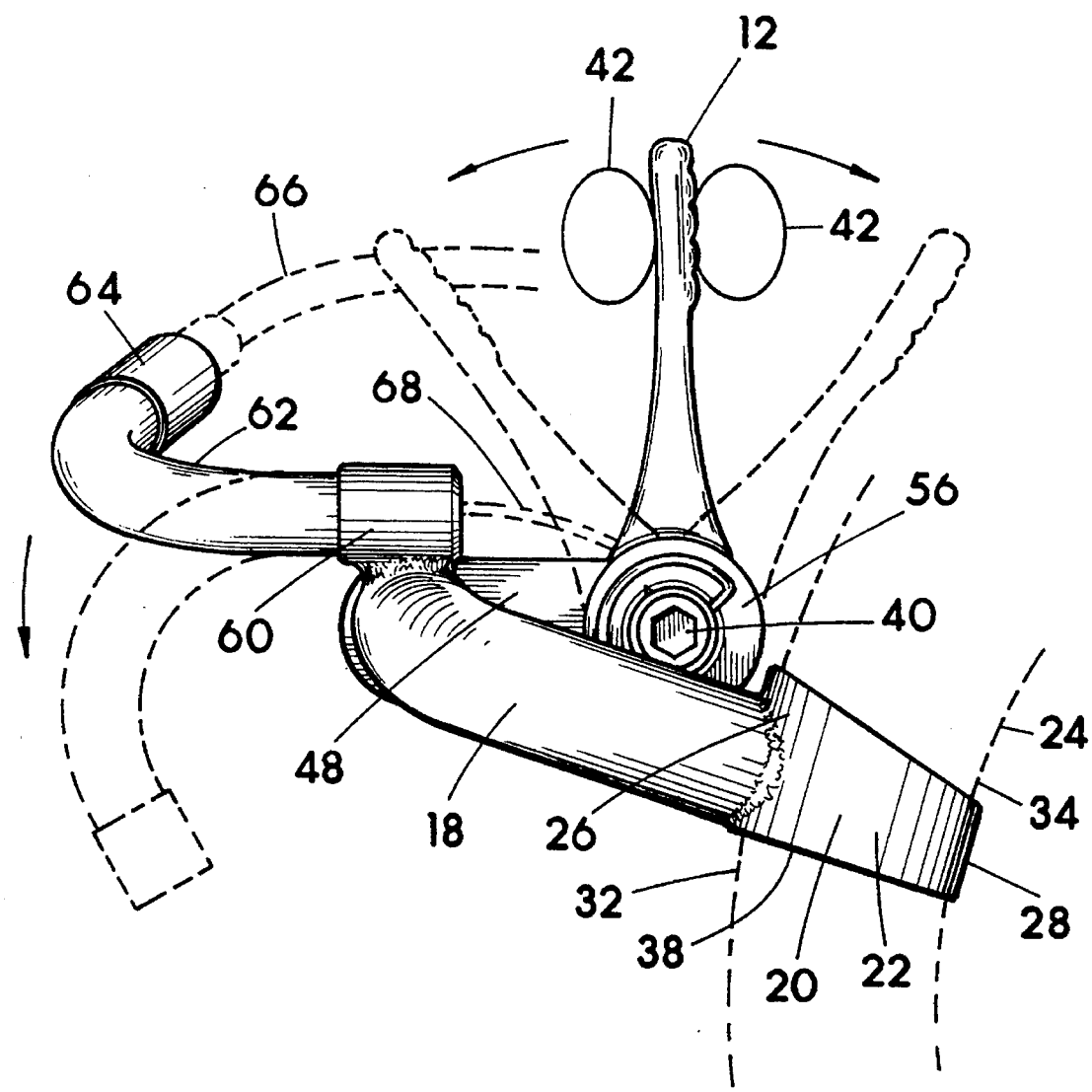
FIG. 3 is an illustrative view of the left hand version of the first preferred embodiment of my invention illustrating the rider's thumb relative to the shift lever for pushing the lever away or pulling it toward him (up or down) to shift gears while riding.
Figure 4:
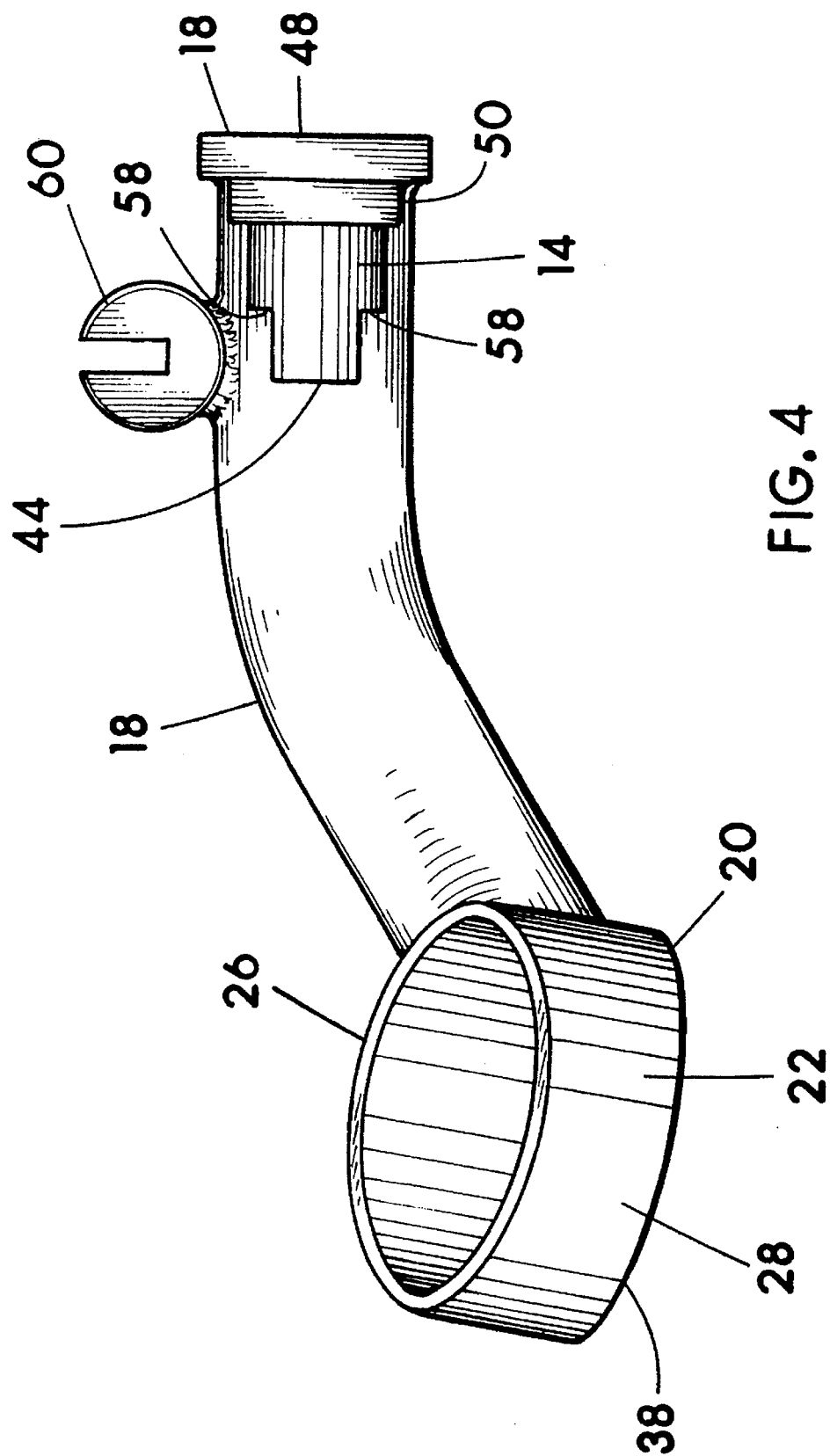
FIG. 4 is an illustrative view of the first preferred embodiment (left hand version) of my invention showing angular changes which position the distal end of the shifter mount stud aiming generally toward the attachment collar but slightly to one side thereof.
Figure 5:
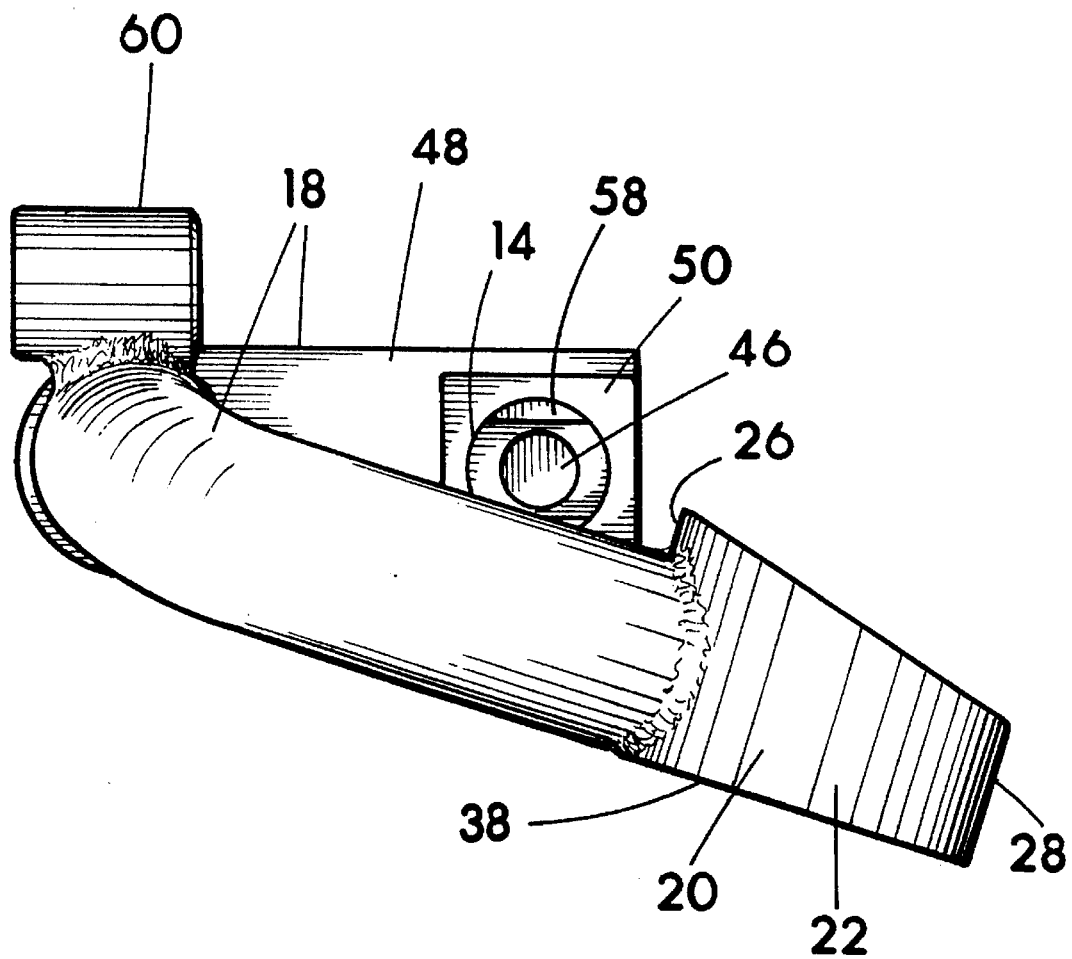
FIG. 5 is an illustrative view of the first preferred embodiment (left hand version) of my invention from a different angle than in FIG. 4. Also shown is the universal shift lever mount stud with the distal end thereof essentially aiming toward the attachment collar, and further with the threaded bore for accepting the shift lever mounting fastener being elevationally raised upward of the extending member adjacent the attachment collar.
Figure 6:
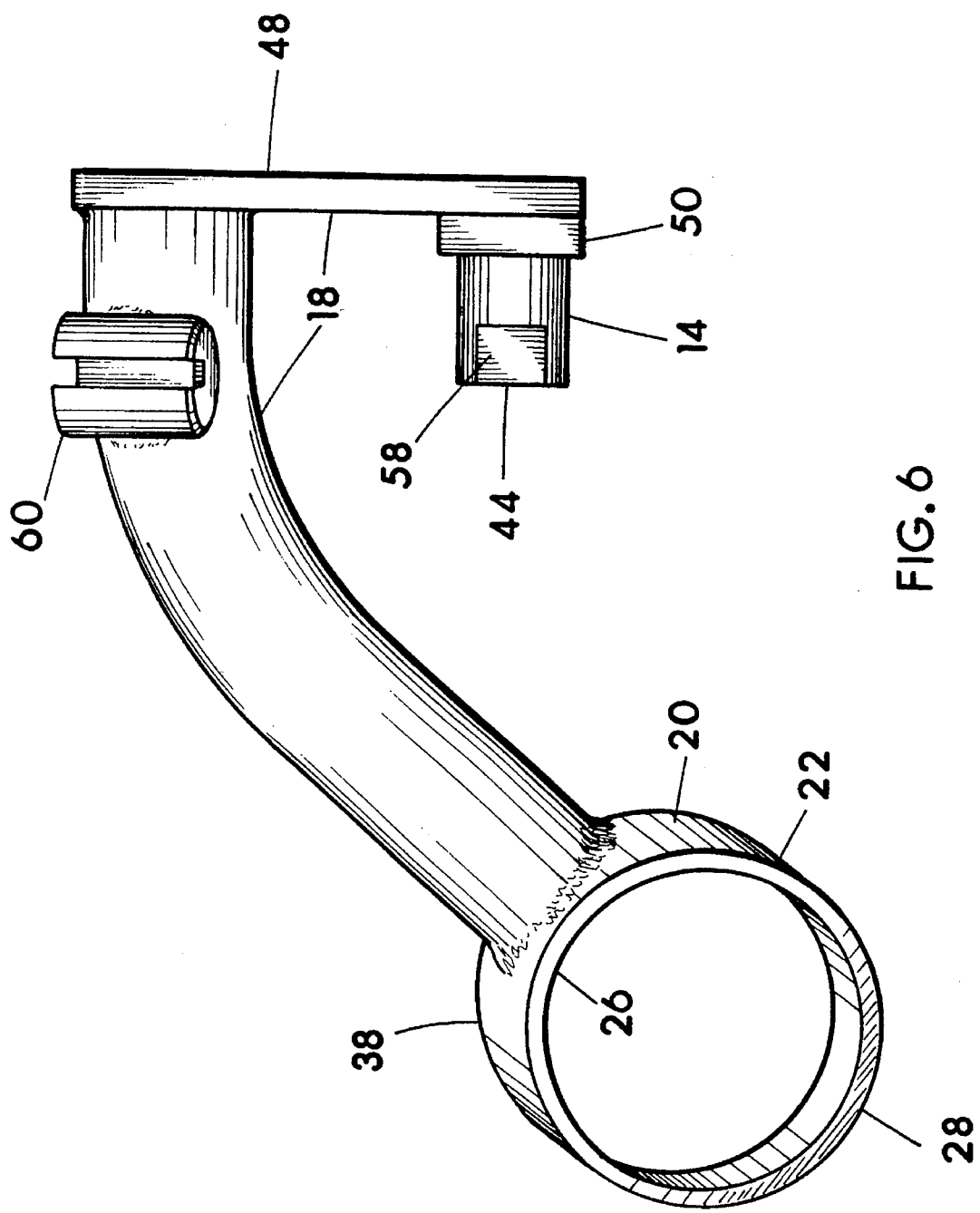
FIG. 6 is an illustrative view of the first preferred embodiment (left hand version) of my invention from what I consider to be a top view.

Affixed to and extending from the attachment collar 20 is the rigid elongated extending member 18. Extending member 18 is attached to attachment collar 20 in the area of the long side 26 of the annular wall 22. In the "area" of the long side 26 refers to extending member 18 being preferably attached slightly around toward the short side 28, since the hand brake mount is typically positioned in the center of the longer radius bend 32 of the handlebar 24, and this is where the longer side 26 of attachment collar 20 is structured to fit, and therefore extending member 18 is attached slightly out of the longest portion of the annular wall 22 in order to provide clearance for the actuation of the hand brake lever as it is moved toward the handlebar 24. Additionally as shown in the drawings, extending member 18 is preferably not affixed in the center from top to bottom of annular wall 22 of attachment collar 20, but is affixed toward what I consider the bottom edge 38 of the annular wall 22, so as to provide a sufficient portion of the annular wall 22 above extending member 18 for the clamping thereof underneath hand brake lever mount 30 as probably best shown in FIG. 9, as this further assures that the user will have a degree of choice as to precisely where he feels the shift lever 12 is ideal for him, as he may rotate attachment collar 20 into various positions on handlebar 24 when brake mount 30 is loosened. The degree of rotation is of course somewhat limited by the shape of the handlebar 24 in the curve thereof and by the shape of the attachment collar 20 and the desire to maintain a close and neat fit of the attachment collar 20 to the handlebar 24, although some positioning choice is available. This choice given the rider of the positioning of the precise location of the attachment collar 20 allows the choice, to a degree, of precisely how far from the handlebar 24 the upper tip of the shift lever 12 will reside on average, allowing that position to be adjusted for different thumb lengths and slightly varying grasping positions on the handlebar 24. The first portion of extending member 18 extends from attachment collar 20 or handlebar 24 at a generally perpendicular angle as best seen in FIG. 1. Extending member 18 preferably includes one or more angular changes between its connection to attachment collar 20 and the distal end of the extending member 18. I consider the distal end of extending member 18 to be essentially that end thereof where the universal shift lever mount stud 14 is attached. The extending member 18 preferably includes the one or more angular changes allowing placement of the extending member 18 clear of the brake lever simultaneously with ideal placement of the shift lever 12 relative to normal and typical hand placements on the handlebar 24 and for operation of the shift lever 12 by the thumb 42 of the adjacent hand grasping the handlebar 24. The angular changes also allow for the proper orientation of the shift lever mount stud 14 as hereinabove described and shown in the drawings, that is with the distal ends 44 of the mount studs 14 facing generally outward away from the longitudinal centerline axis of the bicycle and essentially toward the attachment collar 20.

Shift lever mount stud 14 is affixed to the distal end or distal portion of extending member 18 with the distal end 44 of the mount stud 14 generally or essentially facing in the direction of attachment collar 20. Although the distal end 44 of the mount stud 14 is "essentially" or "generally" facing or aiming toward attachment collar 20, as may be seen in FIG. 5 they are aiming slightly off to one side of the attachment collar 20 for access to the head face of the shifter mounting fastener 40 with an extending wrenching tool as will be more fully appreciated with continued reading. The distal end 44 of the mount stud 14 includes a threaded bore 46 which is for accepting the mounting fastener 40 (threaded bolt or screw) for movably or rotatably attaching a shift lever 12 to mount stud 14. As hereinabove described and as may best be ascertained from FIGS. 3 and 5, extending member 18 also includes an elevational change or offset over its extending length to allow un-obstructed access to the fastener 40 which attaches the shift lever 12 to shift lever mount 10 so as to allow the ready attachment, servicing and replacement of shift levers 12 as desired. The elevational offset may be upward or downward within the intent of such offset, and although the offset is not absolutely necessary from one view point since one could possibly grasp a fastener 40 from the top with pliers or an adjustable wrench if the head were hexagonal or square on the exterior, it can be appreciated that the offset allows the straight-on approach to the head face of the fastener 40 over the top (or bottom) of the extending member 18 and to one side of attachment collar 20 with a screw drive, allen wrench or other elongated wrenching tool appropriate to manipulate the fastener 40, and that such an approach is significantly faster and more convenient to manipulate the fastener 40 generally regardless as to the type of head face.

The length of the extending member 18 in combination with the angular change or changes therein is such that the mount stud 14 and thus essentially the shift lever 12 itself is supported away from the hand grip area, handlebar 24, and attachment collar 20 a distance of about the length of an average human thumb 42, and within a range of about between 1 to 3 inches, with this being to allow the locating of the shift lever 12 by feel rather than sight, and the shifting with the thumb 42 while grasping the handlebar 24 adjacent the hand brake mount 30, whether grasping just above or just below the brake lever mount 30, which are the two most common areas to grasp.

In the example of extending member 18 shown in FIGS. 1–7, the distal portion (second portion) of the extending member is defined by a solid flat bar 48 affixed by welding generally perpendicularly to a tubular or cylindrical first portion of extending member 18 extending from attachment collar 20. The elevational offset previously detailed is rendered by simply rolling flat bar 48 upward to position the distal end thereof and stud 14 out of the plane of the first portion of the extending member 18 prior to affixing bar 48 to the cylindrical portion of extending member 18. Other arrangements may of course be utilized to achieve the angular change and the offset such as by utilizing bent tubing as shown in FIG. 10 with the second embodiment 16, or by casting or molding extending member 18 to the desired shape.

The universal shift lever mount stud 14 as shown in FIG. 7 includes a square base plate 50 attached to the distal portion of extending member 18 as may be ascertained from the drawings. The actual mount stud 14 is attached to the base plate 50. The term "universal" in this disclosure refers to the shift lever mount stud 14, which is considered to include the plate 50, being structured in such a manner that all or virtually all existing shift levers 12 made for attachment to the down tube of a bicycle will be attachable to the preferred shift lever mount stud 14. The shift lever mount stud 14 shown in solid lines in FIG. 7 is a commercially available fitting and is familiar to those skilled in the art, and such a fitting will accept and function with all down tube style shift levers of which I am aware. This commercially available shift lever mount stud 14 would function very well as a component of my invention, and other shift mount studs structured specifically only for a specific make and model of shifter would also function as part of my invention, however it can be appreciated that a universal stud 14 such as shown in FIG. 7 is more appropriate with an invention of this nature. Square base plate 50 is affixed to what I consider the inside surface of the extending member 18. Square base plate 50 is for preventing rolling or is an anti-spin plate for insertion into the square receiving socket 54 of the base 56 of the shift lever 12 to prevent the base 56 of the shift lever 12 from spinning on the mount stud 14. Square base plate 50 could be replaced with the octagonal base plate 52 as shown in dotted lines to double positioning choice. In other words, octagonal plate 52 allows for smaller increments of indexed placement of the shifter base 56 compared to the square plate 50. The shift lever 12 moves relative to its stabilized base 56, and the base 56 is stabilized by engaging or indexing with the plate 50 or 52 of the shift lever mount stud 14. The bases of some makes of down tube style shift levers are stabilized on stud 14 by notches 58 rather than by plate 50 or 52. Affixed to the plate 50 or plate 52 is the cylindrical mount stud 14 which includes threaded bore 46 in the distal end 44 thereof for receiving the fastener 40 which passes through the base 56 of the shift lever 12 and attaches the shift lever 12 to the shift lever mount 10. Stud 14 additionally includes two anti-spin notches 58 each oppositely disposed from one another and toward the distal end 44 of stud 14 as shown in FIG. 7. Notches 58 are necessary for use with some but not all shift lever bases in order to stabilize the base 56. A portion of stud 14 is left annular or cylindrical between plate 50 or 52 and notches 58 as may be seen in the drawings.

Rigidly attached to the top of extending member 18 is what is effect a commercially available cable stop 60 manufactured to receive and stabilize the end of a cable housing 66, and support the cable housing 66 so that the shift cable 68 exists the housing 66 in the correct direction to attach to the shift lever 12. As hereinabove described regarding the desirability of keeping the shift lever movements and the resultant gear changes familiar to the rider, the cable stop 60 is positioned to receive the cable housing 66 coming in from the from of the bike as may be ascertained from FIG. 2. Additionally, although the relatively stiff cable housing 66 and shift cable 68 therein could be cut sufficiently long to swing outward in front of mount 10 and then in a wide bend angle around and into cable stop 60 in order to properly approach cable stop 60, this would render an excessive amount of cable in front of the bike, which would be flopping and vibrating with the bumps of riding, and therefore is less desirable. Therefore I prefer the use of a curved hollow guide tube 62. Guide tube 62 includes a cable stop 64 affixed at one end, and the oppositely disposed end is sized to fit into the cable stop 60 affixed to extending member 18. The fit into cable stop 60 is such that the guide tube 62 is tight, but also sufficiently loose to allow pivoting of the guide tube 62 in the cable stop 60, and this will reduce stresses on the cable housing 66 and shift cable 68. The cable stop 64 at the one end of guide tube 62 receives the terminal end of the cable housing 66, and the shift cable 68 extends through the guide tube 62 and exists through cable stop 60 to extend and connect to shift lever 12 by passing through a hole in the shift lever 12 near the shifter base 56 to be secured in place by a enlargement fitting applied to the end of the shift cable 68 so that the cable 68 cannot be pulled back through the hole. When the cable housing 66 is of the proper length, the cable housing 66 will remain in the cable stop 64 of the guide tube 62, and will push against the guide tube 62 and thereby prevent it from slipping out of the cable stop 60 affixed on the extending member 18. Guide tube 62 is sufficiently curved to receive the cable housing 66 as it extends from the bike frame adjacent the handlebar stem prior to the cable become excessively long or having to make a radical bend. The cable housing 66 terminates at the cable stop 64 affixed to the distal end of the guide tube 62, and the shift cable extends through the guide tube 62 to the shift lever 12.

It should be understood that my shift lever mount may be manufactured using numerous manufacturing methods such as single integral casting or molding with metal or rigid plastics, or by fabrication by way of affixing separate individual components to one another using welding, brazing, adhesives or other affixing arrangements. Therefore for the purposes of this disclosure, the term "affixed" or "affixing" or "attached" may be the bringing together to two components and affixing them together such as by welding or gluing, or it may be the casting of two components integrally together to integrally affix them. For example, attachment collar 20 may be a separate component from extending member 18, wherein during manufacturing the two components are "affixed" together by welding. One the other hand, attachment collar 20 and extending member 18 may be cast or molded as a single integral unit wherein I consider extending member 18 at its point of meeting attachment collar 20 to be "affixed" at that location even though they are inherently connected or integrally affixed by the integral casting or molding of the two components together. Likewise, universal shift lever mount stud 14 may be "affixed" by welding or the like to the distal end of extending member 18, or it may be affixed by integral casting as a component of a single casting.

The detailed description of the invention is to be considered illustrative and for example, and not intended to overly limit the scope thereof, as those skilled in the art will recognize some changes in shapes, sizes, relative positions, materials, etc, may be made to that which is herein described and shown in the drawings without departing from the true scope of my invention.

What I claim as my invention is:

1. A shift lever mount for supporting a gear shift lever on a bicycle handlebar having an existing hand brake lever mount thereon useful for securing said shift lever mount adjacent thereto on the handlebar, said shift lever mount comprising, an attachment collar having a center opening defined by an annular wall with said center opening sized so as to allow said attachment collar to be placed around the handlebar, said annular wall being sufficiently thin in nature so as to allow said attachment collar to be at least in part placed underneath the hand brake lever mount whereby tightening of the hand brake lever mount compresses and stabilizes said attachment collar against the handlebar, an elongated extending member affixed to said annular wall of said attachment collar and extending therefrom inward generally toward an opposite side of the handlebar, said extending member including at least one angular change over its length, a shift lever attachment stud affixed to a distal end portion of said extending member beyond said at least one angular change, said attachment stud including a distal end having a threaded bore for receiving a mounting fastener for affixing the gear shift lever onto said attachment stud, said extending member being of a length which in combination with said at least one angular change in said extending member positions said attachment stud with said threaded bore opening generally toward said attachment collar so as to allow said shift lever mount to support the gear shift lever a distance away from said attachment collar equal to about a human thumb length so as to position the gear shift lever a distance from the handlebar sufficient to allow the gear shift lever to be actuated by an extending thumb of a hand grasping the handlebar adjacent said attachment collar.

2. A shift lever mount according to claim 1 wherein said extending member further includes an elevational change over its said length for providing unobstructed access to a head face of said mounting fastener with an elongated wrenching tool.

3. A shift lever mount for supporting a gear shift lever adjacent a sharp curve on a curved road style bicycle handlebar having an existing hand brake lever mount thereon useful for securing said shift lever mount adjacent the hand brake lever mount on the handlebar, said shift lever mount comprising, an attachment collar having a center opening defined by an annular wall with said center opening sized so as to allow said attachment collar to be placed around the handlebar, said annular wall having a longer length in a first area and a shorter length in a second area so as to allow said attachment collar to be positioned in the sharp curve in the handlebar and in close proximity thereto with said shorter length of said annular wall positioned in an inside smaller radius of the sharp curve and said longer length positioned in an outside longer radius of the sharp curve in the handlebar, said annular wall being sufficiently thin in nature so as to allow said attachment collar to be at least in part placed underneath the hand brake lever mount whereby tightening of the hand brake lever mount compresses and stabilizes said attachment collar against the handlebar, an extending member affixed to said annular wall of said attachment collar and extending therefrom generally toward an opposite side of the handlebar, said extending member including at least one angular change over its length, a shift lever attachment stud affixed to a distal end portion of said extending member, said attachment stud including a distal end having a threaded bore for receiving a mounting fastener for affixing the gear shift lever onto said attachment stud, said attachment stud further including an anti-spin means sized and shaped for insertion into a receiving means in a base of the gear shift lever for preventing the base of the gear shift lever from spinning on said attachment stud, said extending member being of a length which in combination with said at least one angular change in said extending member positions said attachment stud with said threaded bore opening generally toward said attachment collar so as to allow said shift lever mount to support the gear shift lever a distance away from said attachment collar equal to about a human thumb length so as to position the gear shift lever a distance from the handlebar sufficient to allow the gear shift lever to be actuated by an extending thumb of a hand grasping the handlebar adjacent said attachment collar, said extending member further including at least one elevational change over its said length with said elevational change providing for unobstructed access to the mounting fastener of the gear shift lever by an elongated wrenching tool, a shift cable housing support attached to said extending member and positioned for supporting a shift cable within a shift cable housing in approach toward said attachment stud and the gear shift lever.

* * * * *